United States Patent
Peng

(10) Patent No.: US 11,947,665 B2
(45) Date of Patent: Apr. 2, 2024

(54) SECURED COMPUTER CODE AND SYSTEMS, METHODS, AND STORAGE MEDIA FOR CREATING THE SECURED COMPUTER CODE FROM ORIGINAL COMPUTER CODE

(71) Applicant: IRDETO B.V., Hoofddorp (NL)

(72) Inventor: Damon Peng, Ottawa (CA)

(73) Assignee: IRDETO B.V., Hoofddorp (NL)

(*) Notice: Subject to any disclaimer, the term of this patent is extended or adjusted under 35 U.S.C. 154(b) by 114 days.

(21) Appl. No.: 17/681,169

(22) Filed: Feb. 25, 2022

(65) Prior Publication Data

US 2022/0277073 A1    Sep. 1, 2022

(51) Int. Cl.
| | | |
|---|---|---|
| *G06F 21/54* | (2013.01) | |
| *G06F 21/55* | (2013.01) | |
| *G06F 21/57* | (2013.01) | |
| *G06F 21/64* | (2013.01) | |

(52) U.S. Cl.
CPC ............ *G06F 21/54* (2013.01); *G06F 21/554* (2013.01); *G06F 21/577* (2013.01); *G06F 21/64* (2013.01)

(58) Field of Classification Search
CPC ...... G06F 21/54; G06F 21/554; G06F 21/577; G06F 21/64; G06F 21/14; G06F 21/6245; G06F 8/31; G06F 8/447; G06F 21/572
See application file for complete search history.

(56) References Cited

U.S. PATENT DOCUMENTS

| | | | |
|---|---|---|---|
| 2011/0067012 A1 | 3/2011 | Eisen et al. | |
| 2015/0277867 A1 | 10/2015 | Hasabnis et al. | |
| 2019/0205528 A1* | 7/2019 | Bogaert | G06F 21/121 |
| 2022/0156069 A1* | 5/2022 | Bapu | G06F 8/42 |

FOREIGN PATENT DOCUMENTS

| | | | | |
|---|---|---|---|---|
| EP | 3270310 A1 * | 1/2018 | ........... | G06F 21/125 |
| WO | WO-2010062063 A2 * | 6/2010 | ............ | G06F 15/00 |

OTHER PUBLICATIONS

EP21160028.3-1218 Extended Search Report dated Jun. 8, 2021.
Colberg, C. et al., "A Taxonomy of Obfuscating Transformations", Technical Report Department of Computer Science University of Auckland, XX, XX, No. 148, Jul. 1, 1997, pp. 1-36, XP002140038.

* cited by examiner

*Primary Examiner* — Trong H Nguyen
(74) *Attorney, Agent, or Firm* — Rimon PC; Marc S. Kaufman

(57) ABSTRACT

Systems, methods, and storage media for creating secured computer code from original computer code are disclosed. The secured computer code is created from original computer code and has a secured interface between a first code domain and a second code domain of the original computer code, the first code domain including code in a first coding language and the second code domain including code in a second coding language, the first code domain being compiled separately from the second code domain. Exemplary implementations may: identify a code method defined in the first code domain that is declared in the second code domain; create a corresponding code method in the second code domain that has a signature that corresponds to a signature of the code method; and create a transformed code method in the first code domain.

27 Claims, 7 Drawing Sheets

SECURED COMPUTER CODE AND SYSTEMS, METHODS, AND STORAGE MEDIA FOR CREATING THE SECURED COMPUTER CODE FROM ORIGINAL COMPUTER CODE

FIELD OF THE DISCLOSURE

The present disclosure relates to secured computer code and systems, methods, and storage media for creating secured computer code from original computer code.

BACKGROUND

The proliferation of mobile applications, executing on smart phones or other user devices, has resulted in an increase in the transmission of and processing of sensitive data by such devices. For example, "fintech" applications, such as banking, insurance, and other financial applications often require that sensitive personal and financial information is processed by a mobile user device, in the native environment of the user device. Similarly, "healthtech" applications, such as telemedicine and health information portals result in sensitive health information being processed by a mobile user device. Of course, there may be various user devices with various levels of physical and operating system security, and user devices are often accessible by a potential attacker (e.g., not behind a firewall). Therefore, such devices often present an attractive attack target for attackers wishing to obtain sensitive information and/or obtain other content in an unauthorized manner. The concept of "secure software" has become very popular in an attempt to thwart attackers from exploiting relatively insecure devices.

The Android™ operating system is the most common operating system found on smartphones, and other mobile devices, throughout the world. Android™ apps are delivered in the format of an APK or AAB file where there are two main code domains included in in the file. One is the DEX domain which includes the code pieces compiled from some supported languages such as Java and Kotlin. The other one is the native domain which includes the native code pieces compiled from some supported languages such as C and C++.

As illustrated in FIG. 1, 100 is the DEX domain and 102 is a native function declaration in the DEX domain. The method is defined in native domain 101 and can be called in accordance with a protocol, such as the Java Native Interface (JNI). Interfaces 104 between the DEX domain and the native domain are clear to attackers. For example, assume an Android™ app soccer game where the soccer ball size is set in the native domain and used in the DEX domain. There may be a native function named Java_com_xyz_myApp_GetBallSize which is called in the DEX domain for changing the ball size. Hackers could easily watch data flow through the interface to ascertain the parameters and returns on the method. Once the parameters and returns are ascertained, the attacker could readily change the ball size without permissions to make the change. In this example, an attacker can readily ascertain the parameters and returns since the interfaces are clear between the DEX domain and the native domain. This is just a simpler example of course. However, the interface can be exploited in a similar manner for more sensitive/valuable content. Further, while the Example noted above relates to the Android™ operating system, similar issues exist whenever a function is called between domains in various computing environments. Functions implemented by code are often referred to as "methods" and are also referred to a "code methods" herein for clarity.

SUMMARY

The disclosed implementations render interfaces between software domains more secure and less likely to be the target of a successful attack. One aspect of the present disclosure relates to a system configured for creating secured computer code from original computer coded by securing an interface between a first code domain and a second code domain of the original computer code, the first code domain including code in a first coding language and the second code domain including code in a second coding language, the first code domain being compiled separately from the second code domain.

A system for creating protected code may include one or more hardware processors configured by machine-readable instructions. The processor(s) may be configured to identify a code method defined in the first code domain that is declared in the second code domain. The code method may have a signature which includes initial parameters and returns. The processor(s) may be configured to create a corresponding code method in the second code domain that has a signature that corresponds to a signature of the code method. At least one of the parameters of the corresponding code method may be transformed and stored in an array as transformed parameters. The processor(s) may be configured to create a transformed code method in the first code domain. The transformed code method may include the transformed parameters. The transformed code method may be called by the corresponding code method through the interface and having access to the array. The transformed code method may be configured to call the method, receive the original parameters, and return the transformed parameters as encoded parameters.

Another aspect of the present disclosure relates to a method for creating secured computer code from original computer coded by securing an interface between a first code domain and a second code domain of the original computer code, the first code domain including code in a first coding language and the second code domain including code in a second coding language, the first code domain being compiled separately from the second code domain.

The method may include identifying a code method defined in the first code domain that is declared in the second code domain. The code method may have a signature which includes initial parameters and returns. The method may include creating a corresponding code method in the second code domain that has a signature that corresponds to a signature of the code method. At least one of the parameters of the corresponding code method may be transformed and stored in an array as transformed parameters. The method may include creating a transformed code method in the first code domain. The transformed code method may include the transformed parameters. The transformed code method may be called by the corresponding code method through the interface and having access to the array. The transformed code method may be configured to call the method, receive the original parameters, and return the transformed parameters as encoded parameters.

Yet another aspect of the present disclosure relates to a non-transient computer-readable storage medium having instructions embodied thereon, the instructions being executable by one or more processors to perform a method for creating secured computer code from original computer code. The method may include identifying a code method defined in the first code domain that is declared in the second code domain. The code method may have a signature which includes initial parameters and returns. The method may include creating a corresponding code method in the second code domain that has a signature that corresponds to a signature of the code method. At least one of the parameters of the corresponding code method may be transformed and stored in an array as transformed parameters. The method may include creating a transformed code method in the first code domain. The transformed code method may include the transformed parameters. The transformed code method may be called by the corresponding code method through the interface and having access to the array. The transformed code method may be configured to call the method, receive the original parameters, and return the transformed parameters as encoded parameters.

Yet another aspect of the present disclosure is a computer-readable storage media having data structures stored thereon including secured computer code created from original computer code and having a secured interface between a first code domain and a second code domain of the original computer code, the first code domain including code in a first coding language and the second code domain including code in a second coding language, the first code domain being compiled separately from the second code domain.

The data structures include a code method defined in the first code domain that is declared in the second code domain, the code method having a signature which includes initial parameters and returns. A corresponding code method in the second code domain has a signature that corresponds to a signature of the code method, wherein at least one of the parameters of the corresponding code method are transformed and stored in an array as transformed parameters. A transformed code method in the first code domain includes the transformed parameters. The corresponding code method includes a call to the transformed code method through the interface and has access to the array and the transformed code method is configured to call the code method, receive the original parameters, and return the transformed parameters as encoded parameters.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Disclosed implementations transform the interfaces between two software domains, such as the DEX domain and a native Android™ domains, such that the interfaces are obfuscated in a manner which renders it difficult for an attacker to ascertain the actual parameters and returns of a relevant code method. As an example, the method names defined in the native domain and called in the DEX domain can be mangled and the parameters and returns of the native code methods are transformed. The process of filename mangling is well known as a mechanism for translation of the file name for compatibility at the operating system level. It, is known to use mangling techniques when a filename on a filesystem appears in a form incompatible with the operating system accessing it. Such mangling occurs, for example, on computer networks when a Windows machine attempts to access a file on a Unix server and that file has a filename which includes characters not valid in Windows. The disclosed implementations leverage the known concept of mangling for a different purpose.

In the disclosed implementations, for each existing native code method declared in a first domain, a corresponding code method having the same signature (method name, parameters and returns) or a similar signature is created. The parameters and returns are transformed with a random scheme and a random scale/bias. The transformed parameters and returns are stored in an array. The array is passed to a new transformed method in the DEX domain that is defined below. After the call of the new transformed method, it decodes the returns from the array. The corresponding transformed method declaration has the unified parameters of the array without any return. The new transformed method is called in the native domain. The transformed method is defined with unified parameters, which calls the original method.

The transformed method can:
  receive the original parameters and returns back from the unified parameters.
  call the original method with the decoded parameters; and.
  encode the returns with a random scheme and a random scale/bias.

Figure 2:
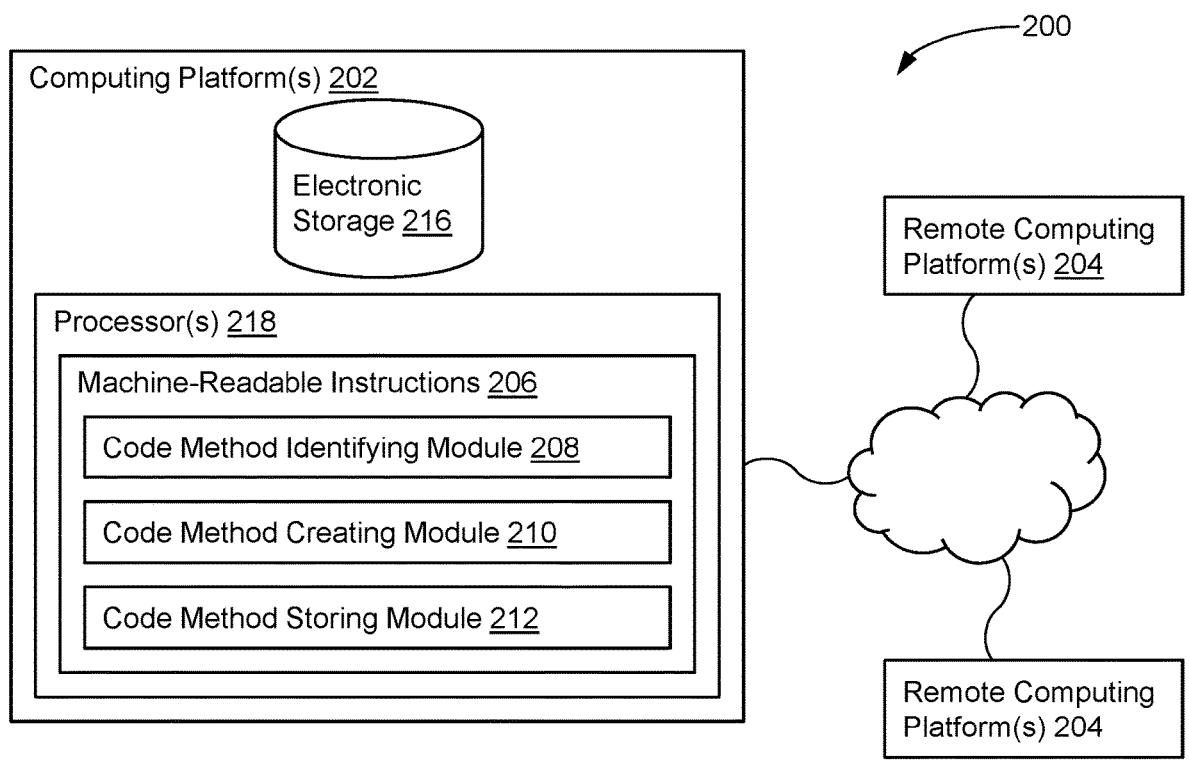
FIG. 2 is a block diagram of a computing system configured for creating secured computer code from original computer code, in accordance with one or more implementations.

FIG. 2 illustrates computer system 200 configured for creating secured computer code from original computer code, in accordance with one or more implementations. In some implementations, system 200 may include one or more computing platforms 202. Computing platform(s) 202 may be configured to communicate with one or more remote computing platforms 204 according to a client/server architecture and/or other architectures. Remote computing platform(s) 204 may be configured to communicate with other client computing platforms via computing platform(s) 202 and/or according to a peer-to-peer architecture and/or other architectures. Users may access system 200 via remote computing platform(s) 204. Alternatively, computing platform(s) 202 can be embodied in the user device. The functions of computing platform(s) 202 described below can be accomplished by a server device, a client device or any combination of one or more server devices and one or more client devices.

Computing platform(s) 202 may be configured by machine-readable instructions 206. Machine-readable instructions 206 may include one or more instruction modules. The instruction modules may include computer program modules. The instruction modules may include one or more of code method identifying module 208, code method creating module 210, code method storing module 212, and/or other instruction modules.

Code method identifying module 208 may be configured to parse original code that is defined in two or more domains and identify a code method defined in a first code domain that is declared in a second code domain. This process can be accomplished by leveraging any known code analysis techniques. For example, such techniques and tools are disclosed in Tracking Explicit and Control Flows in Java and Native Android Apps Code; Mariem Graa, Nora Cuppens-Boulahia, Frederic Cuppens; and Jean-Louis Lanet; https://silo.tips/download/tracking-explicit-and-control-flows-in-java-and-native-android-apps-codehttp://www.fengguow.com/resources/papers/JN-SafCCS18.pdf The code method may include m parameters and n returns. The code method may have a signature which includes the method the number and data type of parameters and returns.

Code method creating module 210 may be configured to create a corresponding code method in the second code domain that has a signature that corresponds to a signature of the code method identified by code method identifying module 208. The corresponding code method may have a signature that is the same as, or similar to, a signature of the code method. By way of non-limiting example, the signature of the corresponding code method may have the same method name, parameters, and returns as the code method.

Code method creating module 210 may be controlled by a human coder, through a remote coding computing device for example, or may be automated through executable code. At least one of the parameters of the corresponding code method may be transformed and stored in an array, such as array 424 of FIG. 4 described below, as transformed parameters. The array may have x elements. Randomly selected placeholders in the array may be used to store the encoded parameters.

Code method creating module 210 may also be configured to create a transformed code method in the first code domain. By way of non-limiting example, the transformed code method may be configured to call the method, receive the original parameters, and return the transformed parameters as encoded parameters. The transformed code method may include the transformed parameters. The transformed code method may be called by the corresponding code method through the interface and having access to the array. Code method storing module 212 may be configured to store the corresponding code method, the transformed code method, and the array on non-transient computer storage media. In the secured code, only transformed parameters are communicated through the interface between the first domain and the second domain to thereby increase security of the interface.

In some implementations, the encoded parameters may include a random bias. In some implementations, the first coding language and the second coding language may be different coding languages. In some implementations, the first code domain may be an android native domain. In some implementations, the second code domain may be a DEX domain. In some implementations, m, n and x may be an integer. In some implementations, x may be greater than m plus n.

It should be appreciated that although the modules are illustrated in FIG. 2 as being implemented within a single processing unit, in implementations in which processor(s) 218 includes multiple processing units, one or more of modules may be implemented remotely from the other modules. The description of the functionality provided by the different modules described herein is for illustrative purposes, and is not intended to be limiting, as any of the modules may provide more or less functionality than is described. For example, one or more of modules may be eliminated, and some or all of its functionality may be provided by other modules. As another example, processor(s) 218 may be configured to execute one or more additional modules that may perform some or all of the functionality attributed to one of modules 208, 210, and/or 212.

Figure 3:
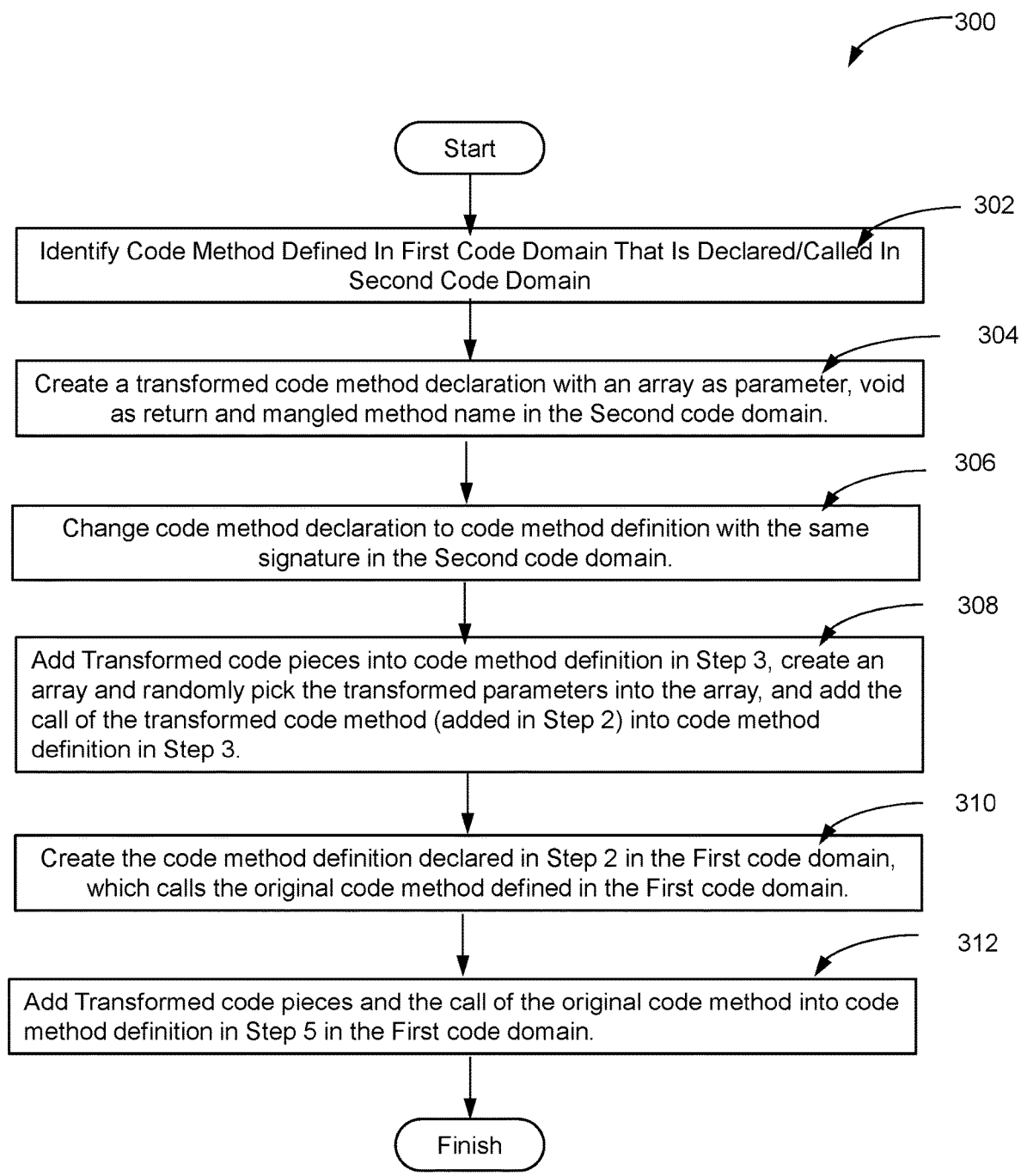
FIG. 3 is a flow chart of a method for creating secured computer code from original computer code, in accordance with one or more implementations.

FIG. 3 illustrates a method 300 for creating secured computer code from original computer code, in accordance with one or more implementations. In some implementations, method 300 may be accomplished with one or more additional operations not described, and/or without one or more of the operations discussed. Additionally, the order in which the operations of method 300 are illustrated in FIG. 3 and described below is not intended to be limiting unless expressly indicated as such.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300. For example, the method can be implemented by computing system 200 of FIG. 2.

In step 1, an operation 302 may include identifying a code method defined in the first code domain that is declared in the second code domain. The code method may have a signature which includes initial parameters and returns. Operation 302 may be performed by one or more hardware processors configured by machine-readable instructions including a module that is the same as or similar to code method identifying module 208.

In step 2, an operation 304 may include creating a transformed code method declaration with an array as parameter, void as return and a mangled method name in the second code domain. Operation 304 may be performed by one or more hardware processors configured by machine-readable instructions including a module that is the same as or similar to code method creating module 210.

In step 3, an operation 306 may include change the code method declaration to a code method definition with the same signature in the second code domain. For example, the code method declaration:

```
method public native getBallSize(II)I
.end method
``` can be changed to the following in the second domain:

```
.method public getBallSize(II)I
.end method
```

Operation 306 may be performed by one or more hardware processors configured by machine-readable instructions including a module that is the same as or similar to code method creating module 210, in accordance with one or more implementations.

In step 4, an operation 308 can include adding transformed code pieces into the code method definition created by operation 306, creating an array, randomly placing the transformed parameters into the array, and adding the call of the transformed code method into the code method definition created by operation 306. As an example, the resulting code method definition in the second domain could be as set for the below.

```
.method public getBallSize(II)I
    encode_1, encode_2 = cw_encode (param_1, param_2)
    int[ ] intLocalArray = new int[8];
    intLocalArray[0] = random_1; intLocalArray[1] = encode_1; intLocalArray[2] = random_2;
    intLocalArray[3] = random_3; intLocalArray[4] = encode_2; intLocalArray[5] = random_4;
    intLocalArray[6] = random_5; intLocalArray[7] = random_6;
    FbW92ZU5hdGl2ZQ(intLocalArray);
        return cw_decode(intLocalArray[7]);
.end method
```

In step 5, an operation 310 can include creating the code method definition declared in operation 304 in the first code domain, which calls the original code method defined in the first code domain. For example, the result can be the following new code method definition in the first domain.

```
JNIEXPORT jint JNICALL
Java_com_xyz_myApp_GameState_FbW92ZU5hdGl2ZQ(JNIEnv
*env, jobject thisObj, jintArray xyz)
{ }
```

In step 6, an operation 312 can include adding transformed code pieces and the call of the original code method into code method definition in created by operation 310 in the first code domain. As an example, the the following new method definition in the first domain could be created.

```
JNIEXPORT jint JNICALL
Java_com_xyz_myApp_GameState_FbW92ZU5hdGl2ZQ(JNIEnv
*env, jobject thisObj, jintArray xyz)
{
    decode_1, decode_2 = cw_decode(xyz[1], xyz[4])
    ret = Java_com_xyz_myApp_GameState_getBallSize(env,
thisObj, decode_1, decode_2);
    xyz[7] = cw_encode(ret)
}
```

The secure code created through the operations described above can be stored in non-transitory computer readable media and executed by a computer hardware processor to thereby increase the security level of the device in which the code is executed.

An example of creating secured computer code in the DEX domain and Android™ native domain is set forth below. However, disclosed implementations can be applied in various code domains. The example is based on the function of setting the size of a ball in a game, as described above. The original code includes a native code method declared in the DEX domain and defined in the native Android™ domain. In this example, the native code method takes two integer parameters and has an integer return. However, any number and type of parameters could be used by the code method.

In this example, the call of the native method in the DEX domain as follows:
    invoke-virtual {v0, p1, p2}, Lcom/xyz/myApp/GameState;→getBallSize(II)I In this example, the native method declaration in the DEX domain as follows:

```
.method public native getBallSize(II)I
.end method.
```

In this example, the method is defined in the native domain as follows:

```
JNIEXPORT jint JNICALL
Java_com_xyz_myApp_GameState_getBallSize(JNIEnv *env,
jobject thisObj, jint i, jint j)
{ ... return size(i,j, temp); }
```

In the original code, the interface between the domains is unsecured and thus an attacker can readily ascertain the parameters and returns. Therefore, the interface presents a relatively easy attack point to the original code. The steps of the disclosed implementations above will now be illustrated through an example of pseudo code.

A corresponding DEX domain method with the same signature as the original native method of getBallSize is created as set forth below:
    .method public getBallSize(II)I The signature (e.g., the parameters and name) of the corresponding method are the same as the native method. However, transforms are applied to the parameters to obtain transformed parameters in the DEX method. For example, any one or more of known transforms could be applied to the parameters. For example, parameters and/or returns could be encoded in accordance with Finite, LinearMBA and multi-MBA transform schemes with different scales and biases.

An array is created for holding all parameters and returns. It is preferable that the array also includes fields for "dummies" which can be chosen randomly to obfuscate the parameters and returns. The array can be defined as follows:

```
const/16 v1, 0x8
new-array v1, v1, [I
.local v1, "intLocalArray":[I. ← Create a new int array with size of 8
const/4 v2, 0x0
const/16 v3, 0x315
aput v3, v1, v2 ← Assign a random dummy to intLocalArray[0]
const/4 v2, 0x1
aput p1, v1, v2 ← Assign parameter 1 to intLocalArray[1]
const/4 v2, 0x2
const/16 v3, 0x3db
aput v3, v1, v2 ← Assign one more random dummy to intLocalArray[2]
```

-continued

```
const/4 v2, 0x3
aput p2, v1, v2   ← Assign parameter 2 to intLocalArray[3]
const/4 v2, 0x4
const/16 v3, 0x7b
aput v3, v1, v2   ← Assign one more random dummy to intLocalArray[4]
const/4 v2, 0x5
const/16 v3, 0x141
aput v3, v1, v2   ← Assign one more random dummy to intLocalArray[5]
```

The array intLocalArray includes two transformed arguments (p1 and p2) and a few random dummy values. The new native method, the transformed method, NewMangledNativeMethod, can be called with the array NewMangledNativeMethodForGetBallSize(intLocalArray)

The returns are kept in the array of intLocalArray and are decoded:

```
decode_return = xtransform_parameter(intlocalArray[7])
return decode_return
.end method
```

The new corresponding transformed native method can be declared in the DEX domain which has an array as the parameter and no return:

```
.method public native NewMangledNativeMethodForGetBallSize([I)V
.end method
```

In the native domain, the definition of a native method which calls the original native method named Java_com_xyz_myApp_GameState_getBallSize(JNIEnv *env, jobject thisObj, jint i, jint j) is created. The original native method can be defined in a Shared Library file, such as a .so file and thus the source code of the original native method might not be available.

```
JNIEXPORT void JNICALL
Java_com_xys_myApp_GameState_NewMnagledNativeMethodGetBallSize
    (JNIEnv *env, jobject thisObj,
    jintArray xy){
// Step 1: get the encoded parameters from the array of xy:
xcode_x = xy[ 1 ]
xcode_y = xy[ 3 ]
// step 2: decode the parameters
original_x = cw_decode(xcode_x)
original_y = cw_decode(xcode_y)
// step 3: call the original native method with the original parameters
original_ret = Java_com_xyz_myApp_GameState_hash123
        (env, thisObj, original_x, original_y)
// step 4: encode the original return
xcode_ret = cw_encode(original_ret)
//step 5: put the encoded return back to the array
xy[7] = xcode_ret
}
```

Finally, the original native method names originally called in the dex domain are changed. For example, in the above sample, the method name Java_com_xyz_myApp_GameState_getBallSize could be changed to to Java_com_xyz_myApp_GameState_hash123. Note that the new method name is only called in the newly generated transformed method.

A few things may require synchronization such that encodes and decodes in both the DEX domain and the native domain are done properly. The randomness of parameters and returns in the generated array is shared in both DEX domain and the native domain. Assuming that there are 3 parameters (p1, p2, p3) and 1 return (r1) for the original native method. An array with 8 elements could be created and 4 placeholders could be randomly selected for p1, p2, p3 and r1. For example, positions of {3, 5, 7, 1} are selected from {1, 2, 3, 4, 5, 6, 7, 8} of the array as the following JSON data structure re-presented.

```
{
    "placeholder_map": {
        "parameters": [
            {"original_pos": "1", "new_pos": "3"},
            {"original_pos": "2", "new_pos": "5"},
            {"original_pos": "3", "new_pos": "7"}
        ],
        "returns": [
            {"original_pos": "1", "new_pos": "1"}
        ]
    }
}
```

The JSON info is shared between the DEX domain and the native domain during the code generation stages such that proper arguments are placed/picked correctly. The schemes and scale/bias used for encoding and decoding the parameters and returns are shared in both the DEX domain and the native domain and can be selected from, for example, the encoding schemes listed above. Normally, there is scale_inv for each scale for each scheme such that the arguments could be encoded/decoded correctly. The relationship of scale and scale_inv is:

$$scale * scale\_inv \mod 2^{\wedge}(32) \equiv 1$$

The constants of scale and the corresponding scale_inv can be generated as pairs and scale can be distributed in the DEX domain for encoding and the corresponding scale_inv in the native domain for decoding. Alternatively, scale can be distributed in the native domain for encoding and the corresponding scale_inv in the dex domain for decoding. An example of the above JSON file extended to include the scale/scale_inv/bias info follows:

```
{
    "placeholder_map": {
        "parameters": [
{"original_pos": "1", "new_pos": "3", "scheme": "Finite",
"scale": "3886940619L", "bias": "3030036027L", "scale_inv":
"2124867043u"},
```

```
{"original_pos": "2", "new_pos": "5", "scheme": "LinearMBA",
    "scale": "3655487939L", "bias": "3396324859L",
    "scale_inv": "3655487939u"},
        {"original_pos": "3", "new_pos": "7", "scheme": "Finite",
            "scale": "3998256263L", "bias": "2667525861L",
"scale_inv": "453671223u"}
    ],
"returns": [
        {"original pos": "1", "new_pos": "1", "scheme": "MultiMBA",
            "scale": "3655487939u", "bias": "3396324859u",
            "scale_inv": "4172556011L"}
    ]
  }
}
```

The JSON info can be shared between the DEX domain and the native domain during the code generation stages such that the proper arguments and returns are encoded/decoded correctly. The resulting code in the Android app in terms of the interfaces between the DEX domain and the native domain are as follows:

```
DEX Domain:
    invoke-virtual {v0, p1, p2},
    Lcom/xyz/myApp/GameState;->getBallSize(II)I
    .method public getBallSize(II)I
    ...
    call newMangledTransformedNativeMethodWithUnifiedSignature
    ...
    .end method
Native Domain:
    JNIEXPORT void JNICALL
    Java_com_xys_myApp_GameState_
    newMangledTransformedNativeMethodWithUnifiedSignature
    (JNIEnv *env, jobject thisObj, jintArray xy) {
    ...
    Call theOriginalNativeMangledMethod
    ...
    }
    JNIEXPORT jint JNICALL
    Java_com_xyz_myApp_GameState_theOriginalNativeMangledMethod
    (JNIEnv *env, jobject thisObj, jint i, jint j)
    { ... return size(i,j, temp); }
```

Figure 4A:
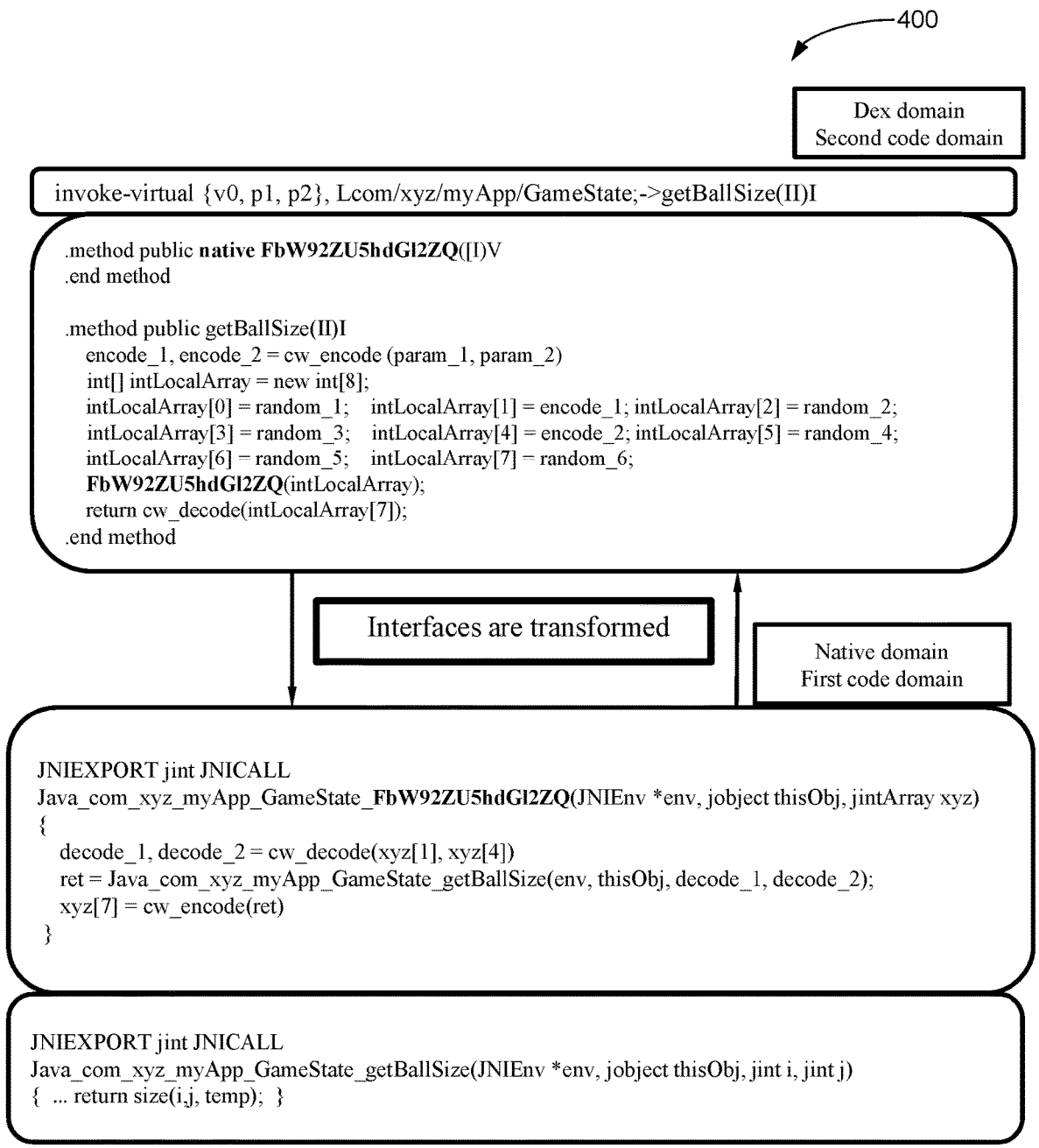
FIG. 4*a* is a schematic diagram representing the secured code of a specific example in accordance with one or more implementations.

FIG. 4a illustrates the secure code sample 400 after applying the security feature where the interface between Dex domain and the Native domain (i.e., the function FbW92ZU5hdGl2ZQ) is transformed. Note that the function name is changed, the parameters are transformed, and the return is transformed.

Figure 4B:
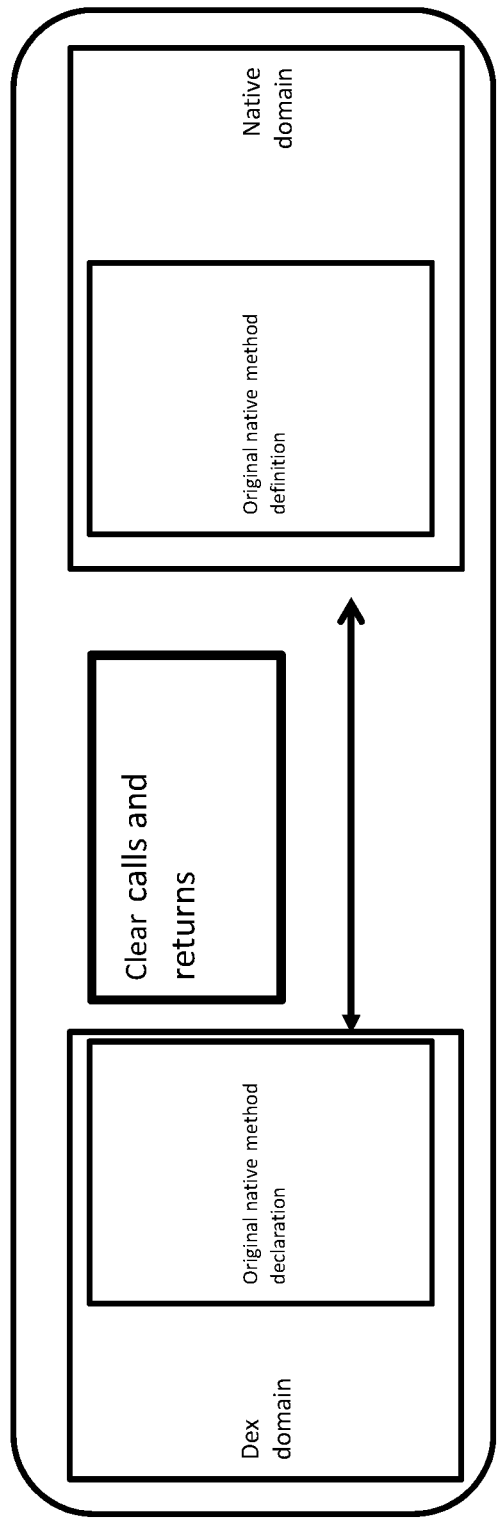
FIG. 4*b* is a schematic diagram of the relationship of unsecured code used to obtain the secured code in the example of FIG. 4*a*.
Figure 4C:
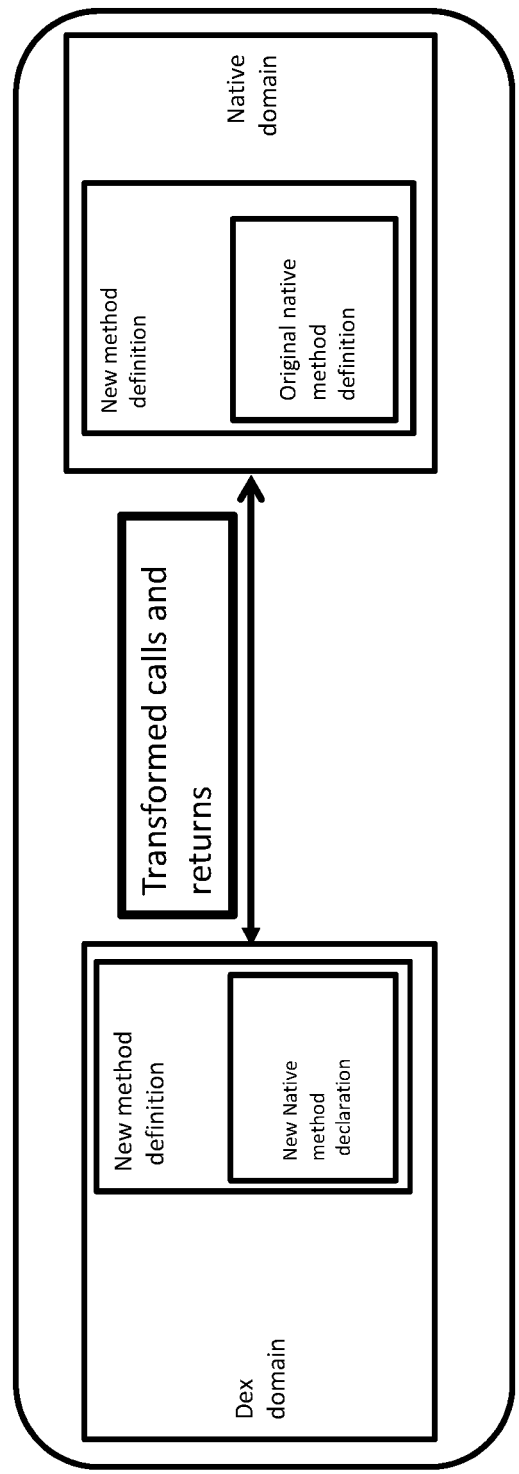
FIG. 4*c* is a schematic diagram of the relationship of secured code of the example of FIG. 4*a*.

FIG. 4b illustrates the relationship between the two code domains before applying the security feature, i.e. according to the original code. FIG. 4c illustrates the relationship between the two code domains after applying the security feature, i.e. according to the secured code. It can be seen that the resulting secured application includes an interface between the two domains that is obscured. In other words, an attacker cannot readily ascertain the true value of the parameters and returns that are passed through the interface.

Figure 5:
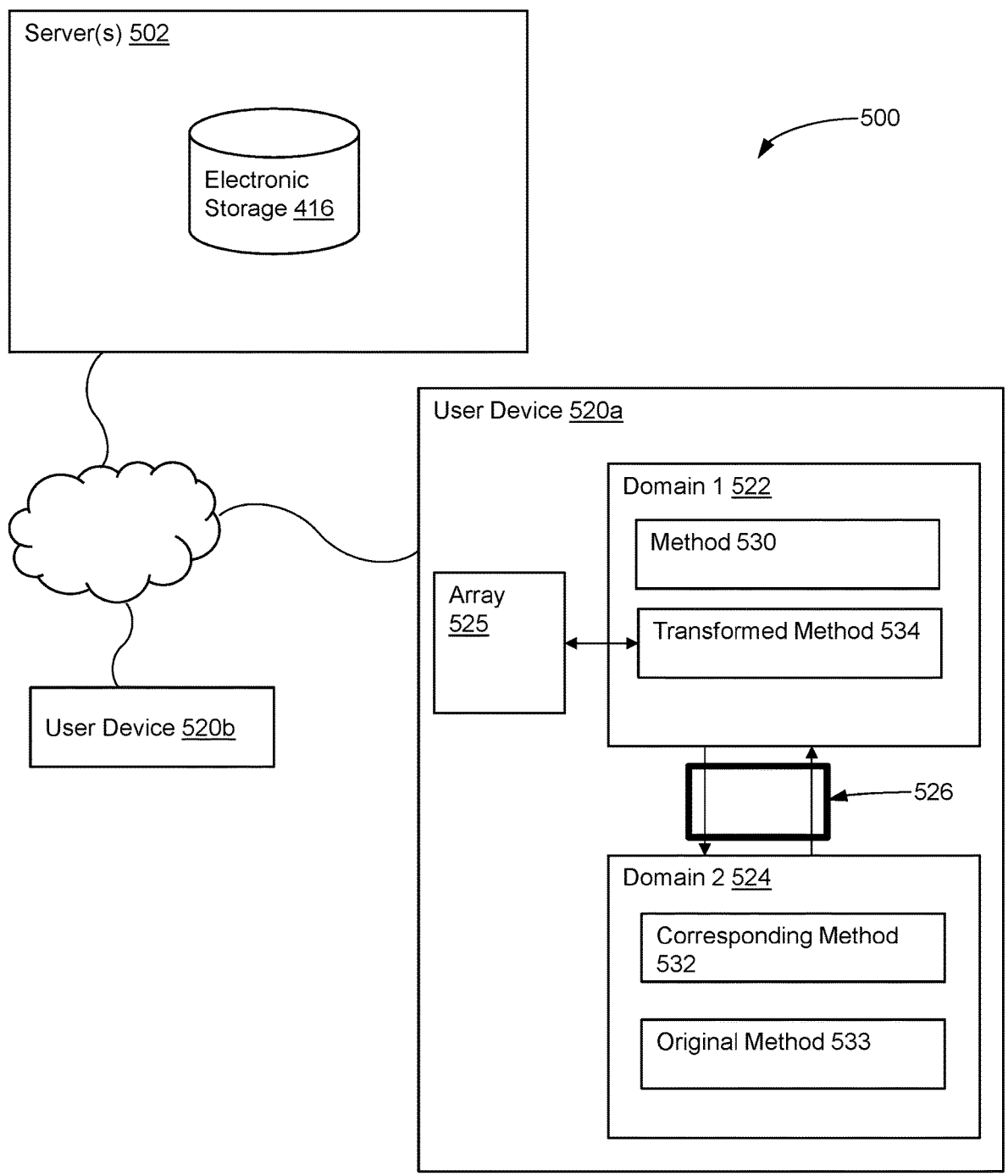
FIG. 5 is a block diagram of a computing system having user devices that are secured in accordance with one or more implementations.

FIG. 5 illustrates a computing system 500 including user device 520a that executes secured code in accordance with disclosed implementations. Server 502 includes electronic storage 516 that includes valuable/sensitive content or other data that is to be transmitted to, and processed by, user devices 520a and 520b. The transmission can be over the internet for example. As an example, server 502 could be associated with a financial institution and the sensitive information could be an account number. As illustrated in FIG. 5, User device 510a includes two code domains, Domain 1 522 and Domain 2 524. A method 530 which is called from Domain 2 524 could process the sensitive account number as a parameter. However, the use of corresponding method 532 in Domain 2 524 and transformed method 534 in Domain 1 522 results in the account number parameter being obscured when transmitted between the domains through interface 526. Original code method 533 is the unprotected method. As noted above, array 525 can store parameters and returns in a random fashion and can be shared between Domain 1 522 and Domain 2 524

In some implementations, computing platform(s) 202 and remote platform(s) 204 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, and remote computing platform(s) 204 may be operatively linked via some other communication media or may be integrated into a single platform or device.

A given remote computing platform 204 may include one or more processors configured to execute computer program modules. The computer program modules may be configured to enable a user associated with the given remote computing platform 204 to interface with computing platform 202 and/or provide other functionality attributed herein to remote computing platform(s) 204. By way of non-limiting example, the given remote computing platform 204 may include one or more of a desktop computer, a laptop computer, a handheld computer, a tablet computing platform, a Smartphone, a gaming console, and/or other computing platforms. External resources, which may include sources of information outside of system 200, external entities participating with system 200, and/or other resources, can also be coupled through a network to system 200.

Figure 1:
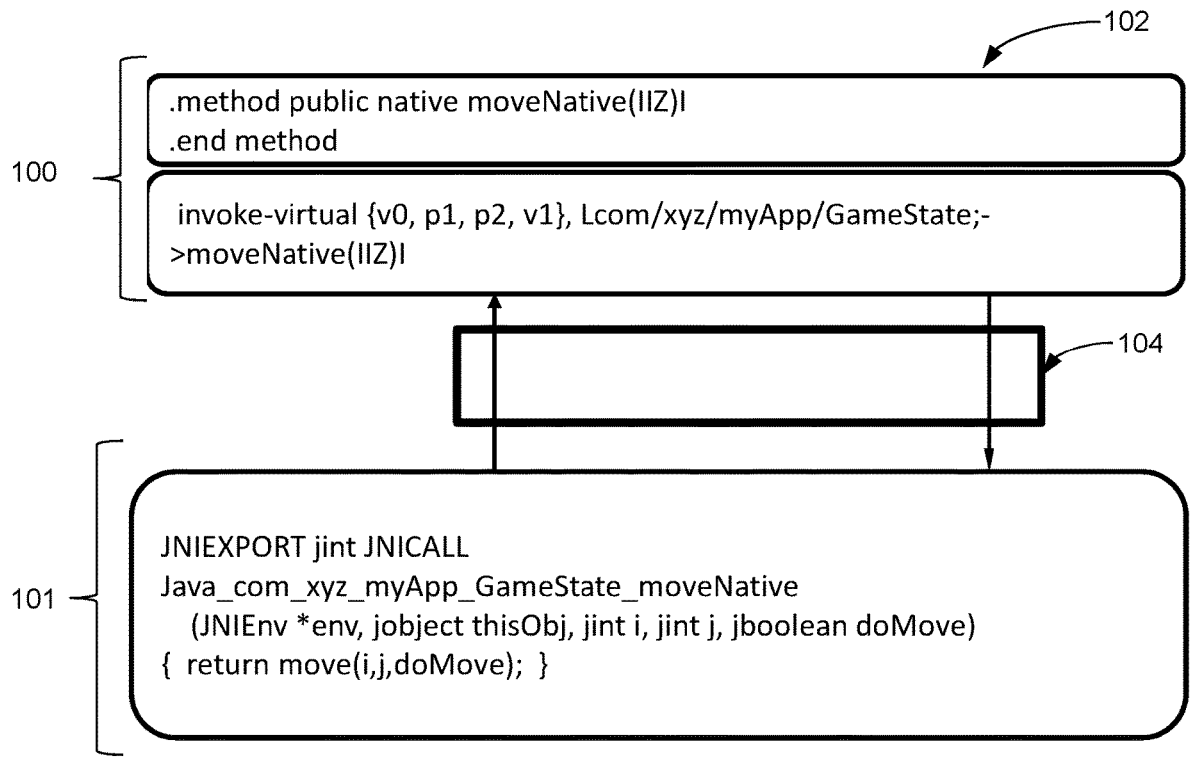
FIG. 1 schematically illustrates a portion of code showing the interface between two code domains.

Computing platform(s) 202 may include electronic storage 116, one or more processors 218, and/or other components. Computing platform(s) 202 may include communication lines, or ports to enable the exchange of information with a network and/or other computing platforms. Illustration of computing platform(s) 202 in FIG. 1 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 216 may comprise non-transitory storage media that electronically stores information. The electronic storage media of electronic storage 116 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 216 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 216 may include one or more virtual storage resources (e.g., cloud storage, a virtual private network, and/or other virtual storage resources). Electronic storage 216 may store software algorithms, information determined by processor(s) 218, information received from computing platform(s) 202, information received from client computing platform(s) 204, and/or other information that enables computing platform(s) 202 to function as described herein.

Processor(s) 218 may be configured to provide information processing capabilities in computing platform(s) 202. As such, processor(s) 218 may include one or more of a digital processor, an analog processor, a digital circuit designed to process information, an analog circuit designed to process information, a state machine, and/or other mechanisms for electronically processing information. Although processor(s) 218 is shown in FIG. 2 as a single entity, this is for illustrative purposes only. In some implementations, processor(s) 118 may include a plurality of processing units. These processing units may be physically located within the same device, or processor(s) 218 may represent processing functionality of a plurality of devices operating in coordination. Processor(s) 118 may be configured to execute modules 208, 210, and/or 212, and/or other modules. Processor(s) 218 may be configured to execute the modules of FIG. 2 and/or other modules by software; hardware; firmware; some combination of software, hardware, and/or firmware; and/or other mechanisms for configuring processing capabilities on processor(s) 218. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for creating secured computer code from original computer code by securing an interface between a first code domain and a second code domain of the original computer code, the first code domain including code in a first coding language and the second code domain including code in a second coding language, the first code domain being compiled separately from the second code domain, the system comprising:
   one or more hardware processors configured by machine-readable instructions to:
   identify a code method defined in the first code domain that is declared in the second code domain, the code method having a signature which includes initial parameters and returns;
   create a corresponding code method in the second code domain that has a signature that corresponds to the signature of the code method, wherein at least one of parameters of the corresponding code method are transformed and stored in an array as transformed parameters;
   create a transformed code method in the first code domain, the transformed code method includes the transformed parameters, the transformed code method being called by the corresponding code method through the interface and having access to the array; and
   wherein the transformed code method is configured to call the code method, receive the initial parameters, and return the transformed parameters as encoded parameters.

2. The system of claim 1, wherein the encoded parameters include a random bias.

3. The system of claim 1, wherein the first coding language and the second coding language are different coding languages.

4. The system of claim 3, wherein the first code domain is an android native domain, and wherein the second code domain is a DEX domain.

5. The system of claim 1, wherein the signature of the corresponding code method has a same method name, parameters, and returns as the code method.

6. The system of claim 1, wherein the code method includes m parameters and n returns, and wherein the array has x elements, wherein m is an integer, wherein n is an integer, wherein x is an integer, and wherein x is greater than m plus n;
   and wherein randomly selected placeholders in the array are used to store the encoded parameters.

7. The system of claim 6 wherein the array is shared between the first code domain and the second code domain.

8. The system of claim 1, wherein the corresponding code method has a signature that is the same as the signature of the code method.

9. The system of claim 1, wherein the one or more hardware processors are further
   configured by machine-readable instructions to store the corresponding code method, the transformed code method, and the array on non transient computer storage media.

10. A method of creating secured computer code from original computer code by securing an interface between a first code domain and a second code domain of the original computer code, the first code domain including code in a first coding language and the second code domain including code in a second coding language, the first code domain being compiled separately from the second code domain, the method comprising:
    identifying a code method defined in the first code domain that is declared in the second code domain, the code method having a signature which includes initial parameters and returns;
    creating a corresponding code method in the second code domain that has a signature that corresponds to the signature of the code method, wherein at least one of parameters of the corresponding code method are transformed and stored in an array as transformed parameters;
    creating a transformed code method in the first code domain, the transformed code method includes the transformed parameters, the transformed code method being called by the corresponding code method through the interface and having access to the array; and
    wherein the transformed code method is configured to call the code method, receive the initial parameters, and return the transformed parameters as encoded parameters.

11. The method of claim 10, wherein the encoded parameters include a random bias.

12. The method of claim 10, wherein the first coding language and the second coding language are different coding languages.

13. The method of claim 12, wherein the first code domain is an android native domain, and wherein the second code domain is a DEX domain.

14. The method of claim 10, wherein the signature of the corresponding code method
has a same method name, parameters, and returns as the code method.

15. The method of claim 10, wherein the code method includes m parameters and n returns, and wherein the array has x elements, wherein m is an integer, wherein n is an integer, wherein x is an integer, and wherein x is greater than m plus n;
and wherein randomly selected placeholders in the array are used to store the encoded parameters.

16. The method of claim 15 wherein the array is shared between the first code domain and the second code domain.

17. The method of claim 10, wherein the corresponding code method has a signature that is the same as the signature of the code method.

18. The method of claim 10, further comprising storing the corresponding code method, the transformed code method, and the array on non-transient computer storage media.

19. A non-transitory computer-readable storage medium having instructions embodied thereon, the instructions being executable by one or more processors to perform a method of creating secured computer code from original computer code by securing an interface between a first code domain and a second code domain of the original computer code, the first code domain including code in a first coding language and the second code domain including code in a second coding language, the first code domain being compiled separately from the second code domain, the method comprising:
identifying a code method defined in the first code domain that is declared in the second code domain, the code method having a signature which includes initial parameters and returns;
creating a corresponding code method in the second code domain that has a signature that corresponds to the signature of the code method, wherein at least one of the parameters of the corresponding code method are transformed and stored in an array as transformed parameters;
creating a transformed code method in the first code domain, the transformed code method includes the transformed parameters, the transformed code method being called by the corresponding code method through the interface and having access to the array; and
wherein the transformed code method is configured to call the code method, receive the initial parameters, and return the transformed parameters as encoded parameters.

20. The computer-readable storage medium of claim 19, wherein the encoded parameters include a random bias.

21. The computer-readable storage medium of claim 19, wherein the first coding language and the second coding language are different coding languages.

22. The computer-readable storage medium of claim 21, wherein the first code domain is an android native domain, and wherein the second code domain is a DEX domain.

23. The computer-readable storage medium of claim 19, wherein the signature of the
corresponding code method has a same method name, parameters, and returns as the code method.

24. The computer-readable storage medium of claim 19, wherein the code method includes m parameters and n returns, and wherein the array has x elements, wherein m is an integer, wherein n is an integer, wherein x is an integer, and wherein x is greater than m plus n; and wherein randomly selected placeholders in the array are used to store the encoded parameters.

25. The computer-readable storage medium of claim 19, wherein the corresponding code method has a signature that is the same as the signature of the code method.

26. The computer-readable storage medium of claim 19, wherein the method further
comprises storing the corresponding code method, the transformed code method, and the array on non-transient computer storage media.

27. Non-transitory computer-readable storage media having data structures stored thereon including secured computer code created from original computer code and having a secured interface between a first code domain and a second code domain of the original computer code, the first code domain including code in a first coding language and the second code domain including code in a second coding language, the first code domain being compiled separately from the second code domain, the data structures comprising:
a code method defined in the first code domain that is declared in the second code domain, the code method having a signature which includes initial parameters and returns;
a corresponding code method in the second code domain that has a signature that corresponds to the signature of the code method, wherein at least one of the parameters of the corresponding code method are transformed and stored in an array as transformed parameters;
a transformed code method in the first code domain, the transformed code method includes the transformed parameters;
wherein the corresponding code method includes a call to the transformed code method through the interface and has access to the array; and
wherein the transformed code method is configured to call the code method, receive the original parameters, and return the transformed parameters as encoded parameters.

* * * * *